(No Model.)  2 Sheets—Sheet 1.
J. J. DE KINDER.
VALVE.
No. 335,112. Patented Feb. 2, 1886.
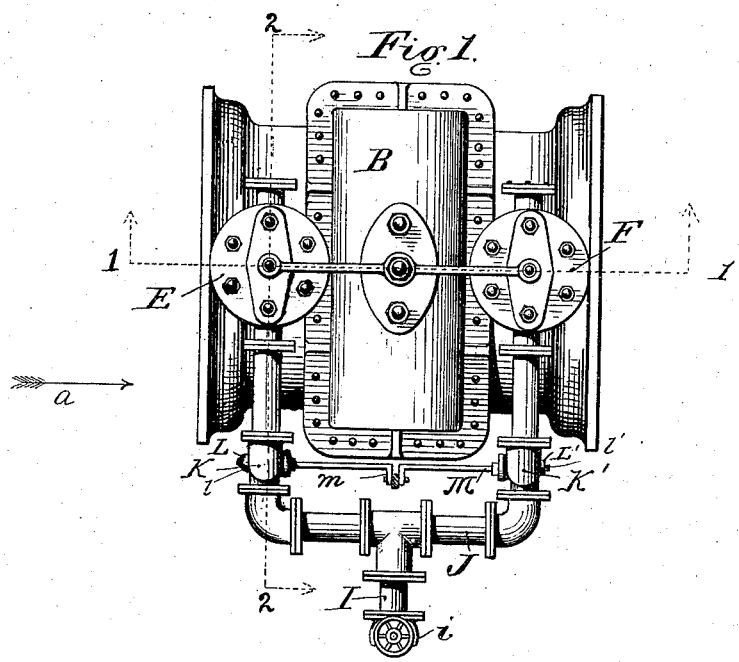
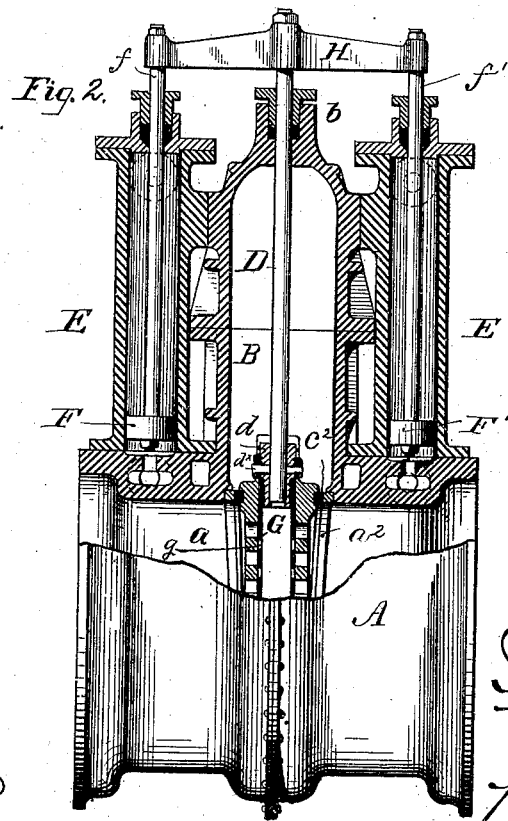
WITNESSES:
John Tolleyson
F. Norman Dixon.
Jos. J. De Kinder
INVENTOR
By his Attorneys
W. C. Strawbridge
Bonsall Taylor (No Model.)  
2 Sheets—Sheet 2.
J. J. DE KINDER.
VALVE.
No. 335,112. Patented Feb. 2, 1886.
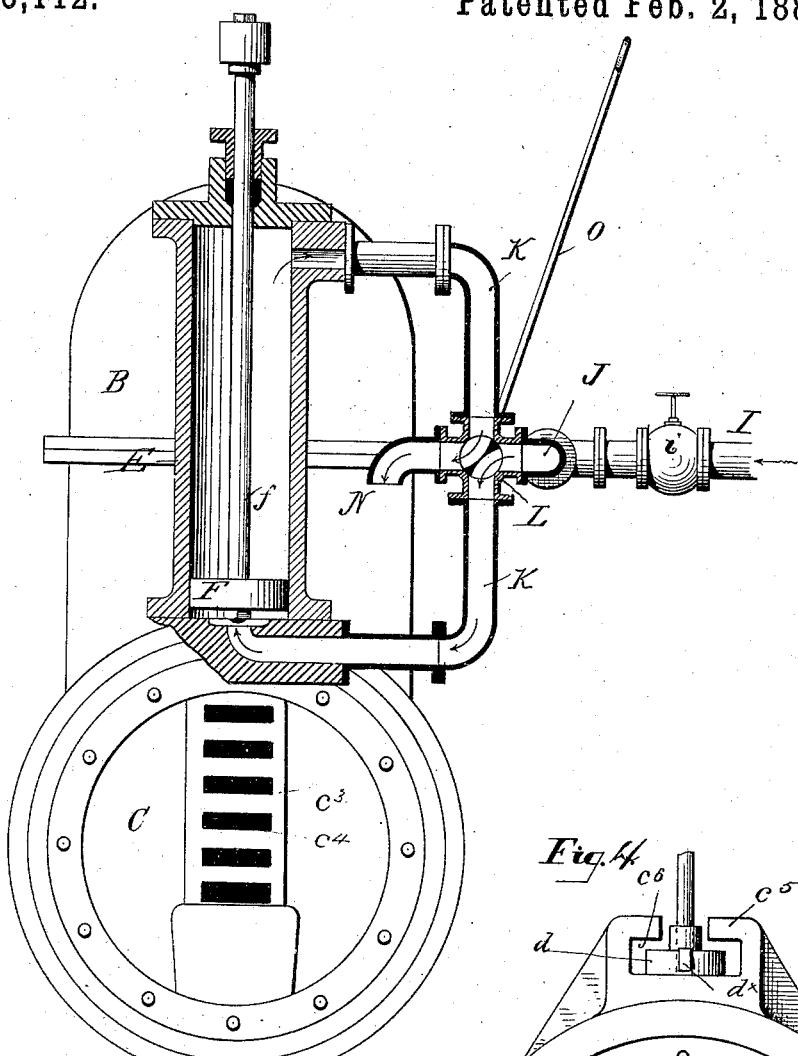
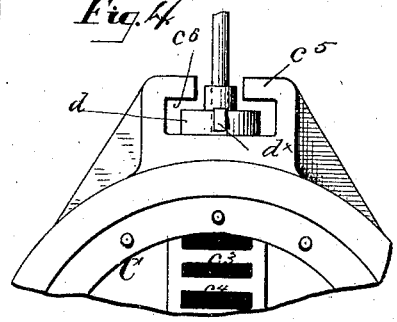
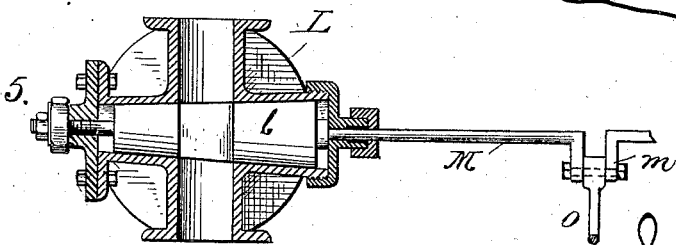
WITNESSES:  
Jos. J. De Kinder  
INVENTOR  
By his Attorneys

UNITED STATES PATENT OFFICE.

JOSEPH J. DE KINDER, OF PHILADELPHIA, PENNSYLVANIA.

VALVE.

SPECIFICATION forming part of Letters Patent No. 335,112, dated February 2, 1886.

Application filed June 24, 1885. Serial No. 169,652. (No model.)

*To all whom it may concern:*

Be it known that I, JOSEPH J. DE KINDER, a citizen of the United States, residing in the city and county of Philadelphia and State of Pennsylvania, have invented an Improvement in Valves, of which the following is a specification.

My invention relates in general to high-pressure valves for pipes, tubes, conduits, or fittings thereof for water, gas, and other liquids and fluids; and it is of especial applicability to high-pressure mains for water, steam, and the like.

My invention is an improvement upon a certain valve invented by one Ernst August Carl Giebeler, of Berlin, Germany, for which application for Patent was filed in the United States Patent Office on May 20, 1885, as Serial No. 166,209, and which is adapted to be employed as a substitute for the costly and cumbrous arrangements known as "side" or "by-pass" valves, and which are generally employed in high-pressure mains and other conduits in which it is necessary at times to cut off or isolate branches.

To thoroughly comprehend my improvements, it is necessary to state the general features of construction of the Giebeler valve. Briefly stated, the Giebeler valve consists in a disk or other suitably-shaped valve, housed for vertical movement transversely within a a valve-seat formed in a main or conduit, the said disk being provided with a series of openings through it which are preferably in the form of slots in the side faces of a tubular enlargement of the disk, which is coincident with its vertical diametric axis, and which openings are adapted to be closed by a tubular or other suitably-shaped slide or register device, which is controlled for movement by means of a valve-stem connected with it, the arrangement being such that the valve-stem is capable of a predetermined vertical movement to an extent sufficient to cause the slide to open or to close the slots in the disk, and, after such movement, is adapted to act as a lifting device to the valve-disk proper, so as either to raise the said disk from out its seat or deposit it therein.

In the aforesaid Giebeler device the valve-stem is screw-threaded and housed in a boxing, so as to be adapted to be rotated, but not moved longitudinally, and the raising and lowering of the valve, as well as the opening and closing of the register device, is accomplished through the interposition of a nut threaded upon the valve-stem and housed in the housing formed upon or connected with the valve-disk, the said nut being connected with the register or slide, and being controlled to receive only a predetermined up-and-down movement with respect to its housing upon the valve-disk. The Giebeler device therefore requires the manual or other rotation of the valve-stem for its operation.

A reference to the application of the said Giebeler will more fully illustrate the foregoing description.

The object of my invention is to improve upon the Giebeler device by dispensing with the threaded valve-stem and substituting in its stead an unthreaded rod or valve-stem, which is connected with a hydraulic arrangement, by the employment of which the said valve-stem, and consequently both the register-slide of the valve and the valve itself are controlled, the arrangement becoming thereby automatic and under the control simply of a valve-cock.

Apparatus embodying a good form of my improvements is represented in the accompanying drawings and described in this specification the particular subject-matter claimed as novel being hereinafter definitely specified.

In the drawings, Figure 1 is a top plan view of an apparatus embodying my improvements. Fig. 2 is a partly elevational and partly sectional front view of the same, the section being supposed in the plane of the dotted line *l l* of Fig. 1, and sight being taken in the direction of the arrows upon said line. Fig. 3 is a side view of the apparatus represented in Fig. 1, section being taken through one of the hydraulic cylinders in the plane of the dotted line 2 2 on Fig. 1, and sight being taken in the direction of the arrows on said line. Fig. 4 is a fragmentary side elevational detail of the housing upon the valve; and Fig. 5 a central horizontal sectional plan of one of the four-way by-pass valve-fittings.

Similar letters of reference indicate corresponding parts in all the figures.

In order to a thorough understanding of my improvements, it is necessary briefly to describe the construction of so much of the apparatus represented in the drawings as was invented by the said Giebeler.

In the drawings, A represents the valve-body, which is introduced into or which is a part of the carrying main. From this body is erected a cap, B, at the upper extremity of which is a journal or stuffing-box, $b$, of any preferred construction. Within the valve-body is formed a tapering cylindriform valve-seat, $a$, within which is adapted to be seated a valve-disk, C, which is circular when viewed from either face and tapering when viewed from the side, and which is of a taper correspondent to that of the valve-seat, so that when introduced therein it is adapted to fit it closely. The valve-body is of course provided with vertical ways, which engage with slide-bearings formed on the sides of the valve-disk, so that said valve-disk is guided in its vertical movement by said ways.

The side faces of the valve-seat are conveniently provided with circular bearing-plates $a^2$, and the side faces of the valve-disk are likewise conveniently provided with circular bearing plates $c^2$, the said bearing-plates respectively registering when the valve-disk is in place and within its seat.

The valve-disk is provided with a series of slots or openings, $c^4$, conveniently formed in a central vertical tubular enlargement, $c^3$, which projects upon both side faces of the disk, and which, as to its projecting or bulging portions, is provided with said slots or openings. The valve-disk is also provided with two upwardly-extending overhanging and facing jaws, $c^5$, containing between them a seat, $c^6$, or housing for a nut.

D is a vertical valve-stem, which is connected with the depending sleeve G, hereinafter described, and by means of a suitably-shaped collar, $d$, fastened by a transverse key, $d^\times$, which plays within the housing $c^6$, and has a vertical movement therein, is also connected with the valve-disk. It is obvious, therefore, that any influence brought to bear to lift the valve-stem will, in the position of parts represented in Fig. 2, cause the elevation of the sleeve G and the lift of the collar until its encounter with the overhanging jaws. G is a depending slotted slide conveniently made in the form of a tubular sleeve, which is fitted within the hollow interior of the tubular enlargement $c^3$ of the valve-disk. This depending sleeve is provided with a series of transverse slots or openings, $g$, upon its sides, which are adapted to register with the slots or opening $c^4$ in the respective sides of the tubular enlargement $c^3$. The sleeve itself is capable of movement up and down within the tubular enlargement upon the movement imparted to the valve-stem which carries it.

So much of the apparatus as is above described is substantially the invention of Mr. Giebeler, and it is very obvious that a motion imparted to the valve-stem to lift it will first occasion the opening of the register, and, after the register is open, the lifting of the valve-disk into the casing B, and that, on the other hand, when the stem is caused to descend the valve will first with it be caused to descend into its seat, and that then the continued downward movement of said stem will occasion the closing of the register.

It is of course obvious, so far as the foregoing device goes, that the specific form and construction of the register devices are not essential, and that the sleeve and slotted enlargement together constitute simply a register device or a system of relief-ports through the valve-disk proper, and that therefore it is possible to fashion both the slotted tubular extension and the slotted slide to another form than the cylindric form shown. The principle of the Giebeler device resides, therefore, in providing a series of openings in a valve-disk with a register slide for controlling them, and in connecting the slide for closing the openings in the disk with a stem, which controls the lift and drop of the valve proper.

The devices which I have invented to occasion the automatic operation of the valve-stem are the following:

E E' are two hydraulic cylinders which are vertically disposed upon the respective sides of the casing B, as shown in the drawings, and which are preferably superimposed direct upon the main or conduit, so as to be, when the device is set, as low down as possible, and not to overtop the cap or casing B.

F F' are pistons which play within the cylinders E E', and are provided with piston-rods $f f'$, which extend through the upper heads of the cylinders and connect with a transverse yoke, H, with which is also connected the upper extremity of the valve-stem D. It is obvious, therefore, that when the pistons are lifted their rods lift the yoke and the yoke lifts the valve-stem, and consequently the register contrivance and the valve-disk, and that a reverse movement of the said parts occurs when the pistons are caused to descend.

In order to at will control the movement of the pistons, I have provided a system of pipes for simultaneously introducing water or other motive fluid, either above or below both pistons.

A convenient system of such pipes is the following: I is what I term a "main" inlet-pipe, which is provided with a cock or valve, $i$, by the regulation of which water or other motive fluid is admitted through said main inlet-pipe. J is a transverse pipe into which the inlet-pipe I opens, and which itself communicates upon its respective ends with two preferably "double branch cylinder inlet-pipes," K K', as I term them, which are respectively applied in a vertical position to the respective cylinders, and which respectively open into or near the respective ends or extremital portions of the said cylinders, as will be clear by reference to the drawings.

At the junctions of the transverse pipe J with the respective cylinder inlet-pipes, K K', four-way by-pass valve fitting L L' are respectively placed, the valves l l' of which, shown in Figs. 3 and 5, are connected together by a horizontal valve-shaft, M, which is conveniently midway of its length between the two cylinder inlet-pipes, provided with a crank, m, so that upon the rotation of said crank by any convenient means, as by the lever O, the valve-shaft is rotated, and the valves together and in the same direction turned.

N is a drip-cock, one being connected with each of the valve-fittings L L', and serving to permit the exhaust of the water from one end of the cylinders during its introduction to the other end.

The entire system of valves which I have just represented and described may be modified in form and arrangement, and, as represented and described, operate simply to permit the controllable introduction of water at the same time, either above or below both pistons in the respective cylinders, and any person familiar with hydraulics will understand that, subject to its admission through the main inlet-pipe, and under the directing control of the by-pass valves l l', water can be introduced at will to either end of the hydraulic cylinders, and that therefore the valve-stem and disk-valve upon the main can, under the operation of the pistons in the said hydraulic cylinders, be controlled at will by the power of the water existing, for instance, in the main itself.

It will be equally obvious to persons familiar with the subject that the cylinder inlet-pipes K K' can be arranged to communicate solely with the lower ends of the cylinders, so that the motive fluid will be employed simply to raise the pistons, and with them the disk-valve, and that in such an arrangement as this, so soon as the motive fluid is allowed to escape from below the pistons the weight of the disk-valve and pistons will occasion their gravitative descent for the closing of the main, and that therefore there will be in such an arrangement no occasion for introducing the motive fluid above the pistons. This is not the arrangement which I prefer. I simply mention it because I think it clearly within the invention.

I do not claim as original with me or seek herein to cover those features of construction which constitute the Giebeler valve proper, and which I have hereinbefore fully contradistinguished from my improvements and mentioned as having been invented by the said Giebeler and as constituting the subject-matter of a certain application for a patent heretofore filed by him. It is also obvious that I can employ but one hydraulic cylinder and piston, although it is preferable to employ two.

Having thus described my invention, I claim—

1. The combination of a high or other pressure valve in a main or other conduit, the hydraulic cylinder, pistons, piston-rods, yoke connecting said piston-rods, and also connected with the stem of the valve, and cylinder inlet-pipes for introducing a motive fluid simultaneously to both cylinders, substantially as set forth.

2. The combination of a high-pressure or other valve in a main or conduit, the hydraulic cylinders, pistons, piston-rods, yoke connecting said piston-rods, and also connected with the stem of the valve, the cylinder inlet-pipes, by-pass valve therein, and inlets for introducing a motive fluid simultaneously to said by-pass valves, substantially as set forth.

3. The combination of the main valve C, the cylinders E E', the cylinder inlet-pipes K K', the by-pass valves l l', the transverse pipe J, the main inlet-pipe I, and the cock or valve i, substantially as described.

4. The combination of the main valve C, the cylinders E E', the cylinder inlet-pipes K K', the transverse pipe J, the main inlet-pipe I, the cock or valve i, the by-pass valves l l', the horizontal valve-shaft M, and the lever O for operating said valve-shaft, substantially as set forth.

In testimony whereof I have hereunto signed my name this 20th day of June, A. D. 1885.

JOSEPH J. DE KINDER.

In presence of—
J. BONSALL TAYLOR,
WM. C. STRAWBRIDGE.